United States Patent [19]

Lee

[11] Patent Number: 4,668,772
[45] Date of Patent: May 26, 1987

[54] METHODS FOR CONTROLLING THE VISCOSITY OF PROTEIN HYDROLYSATES

[75] Inventor: Eldon C. Lee, New Milford, Conn.

[73] Assignee: Nestec S.A., Vevey, Switzerland

[21] Appl. No.: 675,435

[22] Filed: Nov. 27, 1984

[51] Int. Cl.$^4$ .......................... C07K 1/12; C07K 3/10; C09H 9/00

[52] U.S. Cl. ................................. 530/407; 530/300; 530/344; 530/350; 530/412; 210/687

[58] Field of Search ............ 260/112 G, 112 R, 123.5, 260/112 B, 988; 106/124; 210/681, 687; 252/175, 180; 530/350, 366, 402, 407, 412, 418, 427, 300, 344

[56] References Cited

U.S. PATENT DOCUMENTS

| | | | |
|---|---|---|---|
| 3,637,643 | 1/1972 | Wingerd | 530/366 |
| 3,898,160 | 8/1975 | Finley | 210/696 |
| 4,016,039 | 4/1977 | Schreiber | 435/222 |
| 4,043,990 | 8/1977 | Melachouris | 530/416 |
| 4,045,176 | 8/1977 | Proksch et al. | 436/13 |

OTHER PUBLICATIONS de Rham et al, "Nongelling Soy Protein Hydrolysate for Use in Concentrated Fluid Complex Foods", *Journal of Food Science*, vol. 43 (1978) pp. 642-643.

*Primary Examiner*—John Kight
*Assistant Examiner*—Nathan M. Nutter
*Attorney, Agent, or Firm*—Vogt & O'Donnell

[57] ABSTRACT

Methods for controlling the viscosity of protein hydrolysates by adjusting their magnesium and calcium content are disclosed. The viscosity may be reduced by adding a pyrophosphate or other precipitating agent to the hydrolysate and then removing the magnesium and/or calcium precipitate that is formed thereby. Alternatively, the viscosity may be increased by adding a magnesium and/or calcium containing source.

10 Claims, No Drawings

METHODS FOR CONTROLLING THE VISCOSITY OF PROTEIN HYDROLYSATES

BACKGROUND OF THE INVENTION

1. Field of the Invention

This invention pertains to the field of protein hydrolysates. More particularly, it relates to methods for controlling the viscosity of protein hydrolysates by adjusting their magnesium and calcium content.

2. Description of Related Art

Protein hydrolysates and the methods for their preparation are well known. Protein hydrolysates are commonly used in the food industry as flavor enhancers and are sources of "meat-like" flavor. In addition, they also are used for nutritional purposes, such as a protein supplement, as an amino acid source for infant formulas, in special dietary preparations and for parenteral administration of amino acids. Protein hydrolysates have also been found useful in cosmetics and health care products.

In general, protein hydrolysates are prepared by subjecting protein sources to chemical or enzymatic hydrolysis to form a mixture of amino acids or amino acids and peptides.

Chemical hydrolysis includes treatment of the protein source with either an acid or an alkali. Acid hydrolysis of the protein source results in the more physiologically acceptable "L-" form of the amino acids as compared to the less desirable "D-" form which is produced by alkali hydrolysis and which is rarely metabolized by the human body.

The protein sources are readily available from a variety of materials, including both animal and/or vegetable proteins. Animal protein hydrolysates may be obtained from essentially any meat source such as beef, pork, lamb, fowl, fish, etc. They may also be of lactic origin, e.g., casein, lactalbumin, etc. Vegetable protein hydrolysates may be obtained, for example, from wheat germ, rice bran, corn gluten, soy protein, linseed protein, peanut press cake, yeast, and the like. The protein content in these respective starting raw materials may vary from approximately 20 to 90% by weight.

In a typical acid hydrolysis process, for example, the protein source is contacted with hydrochloric acid to cause hydrolysis of the protein. After digestion is substantially complete, the aqueous slurry medium is neutralized with an alkali, such as sodium hydroxide, to stop the hydrolysis reaction, treated with activated carbon and then filtered to remove any insoluble protein and humin (undigested, insoluble material such as fibers) formed in the reaction. The resulting aqueous solution (whether formed as a result of chemical or enzymatic hydrolysis) may then be evaporated to produce three types of commercially available products: (1) a liquid containing about 40% solids by weight; (2) a paste containing about 85% solids by weight; or (3) an essentially dry powder.

A major problem that is encountered when using protein hydrolysates, however, is that upon storage, the viscosity generally increases with time. This is particularly evident and pronounced with those hydrolysates having a higher solids content, such as the commercially available paste. The viscosity of the paste can reach such high levels that it actually becomes rock-like in nature after prolonged storage. This presents difficulties in removing the paste from the container in which it is kept, even after heating. Once removed, it is also troublesome to then disperse and solubilize the paste as needed.

SUMMARY OF THE INVENTION

Applicant has discovered a method for treating protein hydrolysates so as to control their viscosity and thereby avoid substantially all of the above noted problems.

In particular, applicant has discovered that the cause of the viscosity increase with time is the presence of magnesium ions, and to a lesser extent calcium ions, which are contained in the protein hydrolysate. Accordingly, applicant has found that the viscosity of protein hydrolysates can be controlled by adjusting their magnesium and/or calcium ion content. A reduction of these ions results in an immediate decrease of viscosity and renders the hydrolysate resistant to viscosity increase upon storage. Conversely, an increase of these ions in the hydrolysate produces an immediate increase in viscosity and further increases the viscosity upon storage.

In the context of the present invention, "protein hydrolysate" is meant to include: a protein hydrolysate in any stage of preparation such as the neutralized or inactivated reaction product of either chemical or enzymatic hydrolysis, respectively, which product has not been filtered such that it is still in the form of a slurry; the same reaction product which has been filtered such that it is in the form of a solution—regardless of its solids content (liquid or paste); and it also includes the embodiments in which there may be one or more protein hydrolysates derived from various protein sources and/or various hydrolysis reactions.

More specifically, applicant has found that the viscosity of protein hydrolysates can be decreased by complexing the magnesium and calcium ions contained therein with soluble, physiologically acceptable pyrophosphates and then eliminating the insoluble magnesium and calcium salts formed thereby.

It is quite unexpected and surprising that the addition of a pyrophosphate to a protein hydrolysate would result in the reduction of viscosity with time. Thus, in the preparation of an acid hydrolyzed protein, it is conventional to add an orthophosphate, particularly disodium orthophosphate, to the protein hydrolysate to act as a stabilizer and/or buffer. Applicant has found, however, that the presence of the disodium orthophosphate also causes an increase in the viscosity of the treated protein hydrolysate with time. Applicant has discovered that by using a substantially similar compound, i.e., a pyrophosphate instead of an orthophosphate, the pyrophosphate actually reduces the viscosity to the extent desired while at the same time—provided that a sufficient amount of pyrophosphate is added—still provides the stabilization effect of the disodium orthophosphate as well.

Moreover, the employment of the pyrophosphates offers the additional advantages of: not affecting the organoleptic profile of the treated hydrolysates; not affecting the hygroscopicity of the treated hydrolysates; causing no adverse effects upon the amino acid composition of the hydrolysates; and having no typical phosphate after-taste as is true of a disodium orthophosphate treated hydrolysate.

Still further, by virtue of the present invention, it is now possible to use low protein content raw materials as a protein source for the hydrolysates. Applicant has found that these low protein content raw materials correspondingly have a higher magnesium content which causes the viscosity problems noted above. However, by employing pyrophosphates in accordance with the present invention to complex with and precipitate the magnesium and calcium ions, these viscosity problems have now been eliminated.

In an alternative embodiment of the present invention, where it is desired to increase the viscosity of a protein hydrolysate, the magnesium ion content and optionally the calcium ion content in the hydrolysate is raised either by using a protein raw material having a high magnesium (or calcium) content or by adding soluble magnesium and/or calcium salts to the hydrolysate.

DETAILED DESCRIPTION OF THE INVENTION

Without wishing to be bound by theory, it is believed that the mechanism for the viscosity increase with time in the hydrolysates is due to the interaction of the magnesium ions and, to some degree the calcium ions, with the carboxylic groups of the amino acids present in the hydrolysate (about 30% by weight), the organic acids therein (about 7% by weight), and the phosphates which are also present in the hydrolysate (about 2%). The resulting interaction products have low solubility and form a highly viscous medium with time.

Similarly, when conventionally employing the disodium orthophosphate to act as a stabilizer/buffer in an acid hydrolyzed protein, it is believed that at the conventional protein hydrolysate pH range of 4.5 to 6.0, although some complexing with magnesium and/or calcium ions may take place, the amount of such complexing is negligible due to the availability of only one bond to react with the magnesium and calcium. Thus, the majority of the added orthophosphate remains in the protein hydrolysate solution where it, too, apparently interacts with the remaining constituents so as to cause a viscosity increase with time.

In contrast, the pyrophosphates which are employed in the present invention have at least three reaction sites to complex with either magnesium or calcium ions. Because of this, and due to the differences between the dissociation and solubility constants of the pyrophosphate as compared to the orthophosphate, the pyrophosphates are able to provide strong complexing and precipitating abilities even when there is only a small amount of magnesium or calcium ions present.

The pyrophosphates which may be employed in the present invention include all of the edible and water soluble salts thereof such as tetrasodium pyrophosphate, tetrapotassium pyrophosphate, tetraammonium pyrophosphate, sodium acid pyrophosphate, potassium acid pyrophosphate, ammonium acid pyrophosphate, and the like. Any one or more of these pyrophosphates may be employed simultaneously.

It is to be noted that while pyrophosphates are featured herein as a means for complexing with and precipitating the magnesium and/or calcium ions of the protein hydrolysates, the invention is not limited to using only pyrophosphates. Although pyrophosphates are clearly preferred inasmuch as they have been found to be most physiologically acceptable in a comestible product and, moreover, are able to form a highly insoluble magnesium or calcium precipitate, other precipitating agents may also be employed. These other precipitating agents also provide anions capable of complexing with and precipitating the magnesium and/or calcium ions in the protein hydrolysates. Preferably, these agents are also physiologically acceptable. Such additional precipitating agents include the physiologically acceptable alkali metal and ammonium salts, e.g., carbonates, silicates, etc. As with the pyrophosphates, these precipitating agents may be used alone or in any combination with one another.

It should be noted, however, that when using the precipitating agents other than pyrophosphate, the pH of the protein hydrolysate should be adjusted to alkaline conditions since these precipitating agents are generally effective only at a pH greater than 7.0. It is at this alkaline pH that the magnesium and/or calcium salts of the respective precipitating agents are insoluble and precipitate from the hydrolysate solution such that they can be removed. In fact, provided that the pH of the hydrolysate is alkaline, even an orthophosphate is capable of being employed as a precipitating agent. After removing the precipitates, the protein hydrolysate may then be acidified back to the conventional pH range of 4.5 to 6.0.

For reducing the viscosity, the pyrophosphates may be added to the protein hydrolysate at any point after the initial hydrolysis step, i.e., after the raw protein has been contacted with either an acid, alkali or enzyme and the acid or alkali has been neutralized or the enzyme inactivated. After this neutralization or inactivation step, the pyrophosphate may be added at any subsequent stage in the preparation of the protein hydrolysate. Alternatively, the pyrophosphate may be added to a finished hydrolysate product. Similarly, the other precipitating agents noted above may also be added to the protein hydrolysate at any subsequent step after the neutralization or inactivation step provided that the pH of the hydrolysate is adjusted to alkaline conditions, as discussed above. Inasmuch as one of the primary objectives of the present invention is to prevent viscosity increase with time in the finished hydrolysate product, it is most preferable that the pyrophosphate be added during the preparation of the hydrolysate rather than after.

Furthermore, since the addition of the pyrophosphate causes formation of magnesium and/or calcium precipitates, which must be removed, it is therefore desirable to add the pyrophosphate prior to filtration during the preparation of the hydrolysate. In this manner, the magnesium and/or calcium precipitate is simultaneously removed with the humin and other insolubles. The remaining preparation steps are then carried out in their conventional manner including the evaporation of the protein hydrolysate to any extent desired.

The pyrophosphates may be added to the protein hydrolysate after being initially dissolved in an aqueous solution or may be added as a dry powder. The former alternative is preferred for it appears to enable better dissolution of the pyrophosphate thereby increasing the effectiveness of its complexing with the magnesium and calcium ions.

In the alternative embodiment, the pyrophosphate may be added to an already prepared protein hydrolysate solution. The treated solution is then subjected to further processing so as to remove the resulting magnesium and/or calcium precipitate. Such removal of the precipitate may be carried out by any conventional means including filtration, centrifugation, and the like. Of course, in the case where a hydrolysate paste is to be treated, it might be advantageous to first dilute the paste to a more workable composition by the addition of an aqueous medium prior to adding the pyrophosphate. Where the pyrophosphate is added in the form of a solution rather than a dry powder, such addition will generally suffice to both dilute and treat the paste simultaneously. The solution containing the pyrophosphate is then thoroughly mixed and the resulting precipitate removed in the manner described above. Then, if desired, the added water may be removed from the solution to once again form a paste.

In connection with this alternative embodiment, once the protein hydrolysate solution has been stored and the viscosity has begun to increase, the addition of the pyrophosphate will not decrease the extant viscosity. Rather, it will simply react with magnesium and/or calcium ions which have not as yet interacted with the various constituents of the protein hydrolysate so as to prevent any substantial further increase in viscosity with time.

The actual amount of pyrophosphate (or other precipitating agent) added to a protein hydrolysate will, of course, be dependent upon the amount of magnesium and/or calcium ions present in the hydrolysate and the viscosity decrease with time that is desired.

Ideally, to reduce viscosity increase with time as much as possible, the amount of pyrophosphate added is the stoichiometric amount equal to the amount of magnesium and calcium ions present in the protein hydrolysate so as to react with and complex all of these ions. Thus, for example, considering the addition of tetrasodium pyrophosphate, the chemical reaction that takes place can be represented as follows:

$$Na_4P_2O_7 + 2Mg^{+2} \rightleftharpoons Mg_2P_2O_7 \downarrow + 4Na^+$$

or, in other words, one mole of pyrophosphate will remove two moles of magnesium ions (or two moles of calcium ions). One skilled in the art knowing the amount of magnesium and/or calcium ions present in the protein hydrolysate, which can readily be determined, can then easily calculate the amount of pyrophosphate needed to react with those ions. However, due to equilibrium and dissociation considerations, even when the amount employed is greater than the stoichiometric amount, not all of the magnesium and calcium ions will react. Accordingly, there may still be some slight increase in viscosity upon storage as a result of the minor amount of magesium and calcium ions that remain in the protein hydrolysate.

As an indication of how much pyrophosphate is added to a typical protein hydrolysate, it is noted that the addition of approximately 0.5% by weight tetrasodium pyrophosphate to a neutralized slurry of about 45% solids hydrolyzed plant proteins (from corn, rice and wheat protein sources) containing a magnesium content of approximately 2540 ppm on a dry weight basis is sufficient to reduce the magnesium content to about 1490 ppm on a dry weight basis such that the viscosity of a hydrolysate paste made from this neutralized slurry has a very acceptable consistency upon storage which is similar to molasses at room temperature.

If an excess of pyrophosphate is added, i.e., an amount which is greater than the stoichiometric amount, that excess appears to act as a stabilizer and/or buffer much in the same manner as that of the conventionally employed orthophosphate.

As to the relationship between viscosity and the amount of pyrophosphate added, inasmuch as the viscosity is dependent upon so many factors, including solids content, magnesium and calcium ion content, temperature, time, etc., it is not feasible to effectively describe the relationship between viscosity and the addition of the pyrophosphate. However, for a paste hydrolysate containing approximately 75 to 85% solids by weight, applicant has determined that in order to avoid a rock-like condition upon storage after a period of at least about 3 months, the magnesium ion concentration in the hydrolysate should be no more than a value of about 1500 to 2000 ppm on a dry weight basis to provide a paste which upon storage will have the viscosity similar to molasses at room temperature.

In an alternative embodiment of the present invention, where it is desired to raise the viscosity of a protein hydrolysate, the magnesium ion content (and optionally, the calcium ion content) is increased. This is done by means of the addition of a magnesium and/or calcium ion source.

The viscosity may be increased with time by adding soluble salts (preferably edible salts) of either magnesium and/or calcium to the hydrolysate. Such salts include magnesium and/or calcium chloride, sulfate, phosphate, carbonate, hydroxide, and the like. Combinations of these salts may also be used.

Alternatively, the magnesium and/or calcium ion source may be derived from starting raw materials which have a high magnesium and calcium ion content. Thus, as seen in Table I below, which sets forth the chemical composition of a number of protein raw materials, materials such as wheat germ, rice bran, and the like, have a relatively high magnesium content and therefore would be quite suitable as a source for obtaining magnesium ions so as to increase the viscosity of a protein hydrolysate.

TABLE I

| Chemical Composition of Representative Protein Raw Materials | | | |
|---|---|---|---|
| Analysis (%) | Corn Gluten | Wheat Germ | Rice Bran |
| Moisture | 7.73 | 3.18 | 5.04 |
| Protein | 58.64 | 33.70 | 19.68 |
| Ash | 1.08 | 5.05 | 12.57 |
| Fat | 3.58 | 2.18 | 2.14 |
| Carbohydrate | 28.97 | 55.89 | 60.57 |
| | 100.00 | 100.00 | 100.00 |
| Magnesium, ppm | 409 | 3,610 | 7,314 |
| Calcium, ppm | 10 | 169 | 96 |

As with the addition of a pyrophosphate to reduce viscosity, it is not possible to specifically state how much magnesium and/or calcium ions are needed to be added in order to raise the viscosity by a specific amount due to the many variables upon which the viscosity is dependent. However, it is well within the knowledge of one skilled in this art to determine a particular amount of magnesium to be added to a specific protein hydrolysate so as to obtain a desired viscosity increase for a given application.

Applicant has found that a strikingly noticeable viscosity effect is usually obtained when the total solids content of the protein hydrolysate is high, generally greater than about 70% by weight. However, the effect on viscosity is still noticeable even when the solids content is as low as about 45% by weight. At below 45% by weight, the hydrolysate is so dilute that a decrease in viscosity with time by the addition of a magnesium or calcium precipitating agent is generally not measurable. Of course, adding a considerable amount of magnesium or calcium ions even to a 45% solution would significantly and noticeably raise its viscosity.

Having described the basic concepts of this invention, the following Examples are set forth to illustrate the same in which the parts and percentages are by weight. Furthermore, the viscosity determinations set forth in the Examples were made by employing a Brookfield Synchro-Lectric Viscometer model LVT, using spindle T-E at 5 rpm at a temperature of 65° C. These Examples are not, however, to be construed as limiting the invention in any manner.

EXAMPLE 1

This Example demonstrates that the use of a protein source material containing high amounts of magnesium, compared to a control sample low in magnesium, will raise the viscosity of the hydrolysate with time and that the rate of viscosity increase with time is also greatly enhanced.

3,182 g of corn gluten (Sample 1) are acid hydrolyzed with 3,359 g of 32% concentrated hydrochloric acid and 2,000 g of water by adding the acid to the protein and stirring for a period of 4 hours at a temperature of 125° to 130° C. The resulting mixture is then neutralized to a pH of 5.3 by adding 1,182 g of sodium carbonate and 732 g of 50% sodium hydroxide. This neutralized slurry is then filtered and treated with activated carbon. The filtrate is evaporated to form a "paste" having a solids content of about 85% by weight.

Additionally, 3,182 g of a protein source raw material mixture consisting of 33% by weight corn gluten and 67% by weight wheat germ meal (Sample 2) or 50% by weight corn gluten, 25% by weight wheat germ and 25% rice bran (Sample 3) are treated in the same manner described above. The magnesium and calcium content of the protein hydrolysates and their viscosity at various stages of storage are set forth below in Table II:

TABLE II

| Magnesium Content (ppm, dry wt. basis) | Calcium Content (ppm, dry wt. basis) | Paste Viscosity ($\times 10^3$ cps at 65° C.) (Months Stored at Ambient Temperature) | | |
|---|---|---|---|---|
| | | Initial | 1-Month | 3-Months |
| 240[1] | 80[1] | 100 | 110 | 120 |
| 1,897[2] | 77[2] | 110 | 300 | 640 |
| 2,539[3] | 48[3] | 110 | 900 | 2,480 |
| Protein Source: | 1. | 100% corn gluten | | |
| | 2. | 33% corn gluten | | |
| | | 67% wheat germ | | |
| | 3. | 50% corn gluten | | |
| | | 25% wheat germ | | |
| | | 25% rice bran | | |

The above data demonstrates that use of a material containing high amounts of magnesium will raise the viscosity of the protein hydrolysate with time and that the rate of viscosity increase with time is also greatly enhanced. Thus, when compared to the control corn gluten (Sample 1), it is seen that the samples which contain wheat germ (Sample 2) or both wheat germ and rice bran (Sample 3), both of which have a high magnesium content, have a much higher viscosity upon storage than the control corn gluten sample.

EXAMPLE 2

This Example demonstrates the effect on viscosity of storing a protein hydrolysate and the effect of adding a pyrophosphate in various quantities thereto in accordance with the present invention.

3,182 g of a raw protein mixture consisting of 10% by weight wheat germ, 60% by weight corn gluten and 30% by weight rice bran are hydrolyzed by adding 3,359 g of 32% concentrated hydrochloric acid and 2,000 g of water to the protein mixture and then stirring for a period of 4 hours at a temperature of 125° to 130° C. The resulting mixture is then neutralized to a pH of 5.3 by adding 1,182 g of sodium carbonate and 732 g of 50% sodium hydroxide. This neutralized slurry is then divided into a series of aliquots to which various amounts of tetrasodium pyrophosphate are added. Each of the aliquots is then filtered and treated with activated carbon. The aliquots are then evaporated to form a paste having a solids content of about 85% by weight. Set forth below in Table III are the data with respect to the amount of pyrophosphate added, magnesium and calcium content after filtration as well as the viscosity of each of the respective aliquots upon storage.

TABLE III

| Amount of Pyrophosphate Added (% by weight of aliquot treated) | Magnesium Content After Final Filtration (ppm, dry wt. basis) | Calcium Content After Final Filtration (ppm, dry wt. basis) | Viscosity of Paste ($\times 10^6$ cps at 65° C.) (Months Stored) | | | | |
|---|---|---|---|---|---|---|---|
| | | | 0 | 2 | 4 | 6 | 8 |
| 0 | 2,214 | 429 | 0.1 | 1.7 | 3.3 | 5.0 | 6.6 |
| 0.2 | 1,786 | 326 | 0.1 | 1.0 | 1.8 | 2.5 | 3.0 |
| 0.4 | 1,345 | 274 | 0.1 | 0.3 | 0.5 | 0.7 | 0.9 |
| 0.6 | 1,000 | 226 | 0.1 | 0.2 | 0.3 | 0.3 | 0.5 |
| 0.8 | 726 | 206 | 0.07 | 0.1 | 0.2 | 0.2 | 0.3 |
| 1.0 | 512 | 190 | 0.07 | 0.1 | 0.1 | 0.1 | 0.1 |
| 1.2 | 345 | 167 | 0.05 | 0.08 | 0.1 | 0.1 | 0.1 |
| 1.4 | 219 | 155 | 0.01 | 0.05 | 0.1 | 0.1 | 0.1 |
| 1.6 | 131 | 150 | 0.01 | 0.05 | 0.1 | 0.1 | 0.1 |

The above data demonstrates that the addition of a pyrophosphate in accordance with the present invention not only decreases the paste viscosity of the protein hydrolysate immediately, but most importantly, controls the paste viscosity of the hydrolysate during storage so that the hydrolysate is resistant to viscosity increase.

EXAMPLE 3

In this Example, about 0.4% by weight of tetrapotassium pyrophosphate is added to one of the aliquots of Example 2. The aliquot is then filtered, treated with activated carbon and then evaporated to form a paste having a solids content of about 85% by weight. After filtration, the magnesium content is about 1350 ppm on a dry weight basis. After storage for 8 months, the paste viscosity is about $1.0 \times 10^6$ cps measured at 65° C. which is an acceptable viscosity similar to that of molasses.

EXAMPLE 4

This Example demonstrates the effect on viscosity of pyrophosphate treatment as the total solids content of the protein hydrolysate is increased. A solution containing 0.8% tetrasodium pyrophosphate by weight is added to protein hydrolysate solutions containing various total solids concentrations. The results are set forth in Table IV.

TABLE IV

| | Viscosity ($\times 10^3$ cps at 65° C.) (Months stored) | | | |
|---|---|---|---|---|
| | 0 Months | | 4 Months | |
| % Total Solids Protein Hydrolysate | Without Pyrophosphate Treatment | With Pyrophosphate Treatment | Without Pyrophosphate Treatment | With Pyrophosphate Treatment |
| 40 | .12 | .12 | .12 | .12 |
| 55 | .22 | .22 | .26 | .22 |
| 70 | 10 | 10 | 100 | 10 |
| 85 | 70 | 70 | 3,300 | 100 |

The data in Table IV demonstrates that the effect of pyrophosphate treatment on the viscosity is greater at the higher solids content, particularly more than 70% total solids.

EXAMPLE 5

An aliquot containing 0.45% by weight of added tetrasodium pyrophosphate and an aliquot containing a control sample of neutralized slurry, both samples being obtained from those prepared in Example 2, are subjected to both triangular taste tests and preference taste tests by a panel of twenty-four professional taste testers to determine the differences, if any, between the treated and untreated protein hydrolysates.

The results of this testing show that the organoleptic profile of the treated hydrolysate remains unchanged. There is no significant change in either taste or quality of the protein hydrolysate treated with the pyrophosphate as compared to the untreated hydrolysate.

EXAMPLE 6

This Example shows that the addition of a pyrophosphate to a protein hydrolysate causes no significant change in the amino acid composition thereof. The aliquots of treated and untreated protein hydrolysates used in Example 5 are each analyzed to determine their amino acid composition. The results of this analysis are set forth in Table V as follows:

TABLE V

Amino Acid Composition of Control and Pyrophosphate-Treated Protein Hydrolysates

| | Percentage by Weight | |
|---|---|---|
| Amino Acid | Control | Treated |
| Aspartic Acid | 2.24 | 2.23 |
| Threonine | 0.95 | 0.96 |
| Serine | 1.57 | 1.63 |
| Glutamic Acid | 9.82 | 9.83 |
| Proline | 2.93 | 2.89 |
| Glycine | 0.97 | 0.88 |
| Alanine | 2.95 | 2.80 |
| Valine | 1.20 | 1.76 |
| Methionine | 0.47 | 0.37 |
| Isoleucine | 0.56 | 0.52 |
| Leucine | 1.52 | 1.49 |
| Tyrosine | 0.25 | 0.19 |
| Phenylalanine | 1.22 | 1.15 |
| Histidine | 0.48 | 0.53 |
| Lysine | 0.66 | 0.85 |
| Ammonia | 0.50 | 0.54 |
| Arginine | 1.41 | 1.10 |
| TOTAL | 29.70 | 29.72 |

EXAMPLE 7

This Example shows that the addition of a pyrophosphate has no significant affect upon the hygroscopicity of the treated protein hydrolysate.

Again, the aliquots of treated and untreated protein hydrolysates of Example 5 are exposed to various degrees of relative humidity at a constant temperature of 25° C. after all of the water is first removed from each of these respective aliquots to form an anhydrous material. Results of this testing are set forth in Table VI, which is set forth below, which shows that hygroscopicity is not affected by the treatment with the pyrophosphate.

TABLE VI

| | Moisture Content (g $H_2O$/100 g anhydrous sample) | |
|---|---|---|
| % Relative Humidity | Untreated | Treated |
| 12% | 2.0 | 2.0 |
| 33% | 6.0 | 7.0 |
| 48% | unavailable | 14.0 |
| 76% | 27.0 | unavailable |
| 97% | 65.5 | 50.2 |

EXAMPLE 8

This Example demonstrates how the viscosity of a protein hydrolysate increases by the addition of a soluble magnesium or calcium slat. A hydrolyzed plant protein derived from corn gluten containing 240 ppm magnesium and 80 ppm calcium on a dry weight basis is divided into two aliquots. To one aliquot, various amounts of magnesium chloride are added. To the other aliquot, calcium chloride is added in various amounts. The effect on paste viscosity after 1 month of storage is shown in Table VII below.

TABLE VII

| $Mg^{+2}$ Added (ppm) | VISCOSITY ($\times 10^3$ cps @ 70° C.) | $Ca^{+2}$ Added (ppm) | VISCOSITY ($\times 10^3$ cps @ 70° C.) |
|---|---|---|---|
| 0 | 100 | 0 | 100 |
| 1,000 | 350 | 1,000 | 110 |
| 2,000 | 610 | 2,000 | 120 |
| 3,000 | 1,260 | 3,000 | 150 |
| — | — | 5,000 | 340 |

As is seen, the addition of either magnesium or calcium to a protein hydrolysate increases the paste viscosity thereof. However, the addition of magnesium has a much greater influence upon the viscosity.

EXAMPLE 9

This Example demonstrates the effect of pyrophosphate treatment on the paste viscosity of an enzymatically hydrolysed protein hydrolysate (fermented soy sauce).

Aliquots of fermented soy sauce (30% solids) (Kikkoman International Inc., San Francisco, Calif.) are heated to 60° C., combined with various amounts of tetrasodium pyrophosphate, maintained at 60° C. for 1 hour, and then filtered to remove the precipitates of magnesium and calcium pyrophosphates. The filtrate is concentrated to a paste of approximately 85% solids by weight. Set forth below in Table VIII are the data with respect to the amount of pyrophosphate added, magnesium and calcium content after filtration as well as the viscosity of each of the respective pastes upon ambient storage.

TABLE VIII

| Amount of Tetrasodium Pyrophosphate Added (% by weight of aliquot treated) | Magnesium Content After Filtration (ppm, dry wt. basis) | Calcium Content After Filtration (ppm, dry wt. basis) | Paste Viscosity ($\times 10^6$ cps at 65° C.) (Months Stored) | |
|---|---|---|---|---|
| | | | 0 | 2 |
| 0 | 2,210 | 1,911 | 0.10 | 1.8 |
| 0.4 | 1,273 | 1,138 | 0.10 | 0.80 |
| 0.8 | 593 | 835 | 0.12 | 0.35 |
| 1.2 | 308 | 407 | 0.12 | 0.22 |

The above data demonstrates that the addition of pyrophosphate to an enzymatically hydrolysed protein hydrolysate decreases the paste viscosity of the hydrolysate after storage for a period of at least 2 months.

EXAMPLE 10

This Example demonstrates the use of a precipitating agent other than a pyrophosphate, such as an orthophosphate, which also is capable of reducing the magnesium and/or calcium content of a protein hydrolysate and, thereby reducing the paste viscosity of the hydrolysate.

A 1,000 g sample of neutralized protein hydrolysate slurry is obtained in accordance with Example 2. The pH of the sample is adjusted to a value of 8.0 by adding sodium hydroxide. 5.0 g of powdered disodium orthophosphate is added to the slurry and insoluble magnesium and calcium salts of orthophosphate are thereby precipitated. After filtration of the precipitate, the filtrate is acidified to a pH of 5.3 by addition of hydrochloric acid. The liquid protein hydrolysate is then evaporated to form a paste having a solids content of 85% by weight. Set forth below in Table IX is the data with respect to the magnesium and calcium content of the hydrolysate before and after treatment with the orthophosphate:

TABLE IX

| Protein Hydrolysate | Magnesium Content (ppm, dry wt. basis) | Calcium Content (ppm, dry wt. basis) |
|---|---|---|
| Untreated | 1,995 | 295 |
| Treated with Orthophosphate | 19 | 58 |

The above data demonstrates that the treatment of a protein hydrolysate with disodium orthophosphate at an alkaline pH reduces the magnesium and calcium content and, therefore, also decreases the paste viscosity of the hydrolysate upon storage.

I claim:

1. A method for decreasing the viscosity of a protein hydrolysate which comprises reducing the magnesium content of the protein hydrolysate.

2. The method of claim 1, which further comprises reducing the calcium content of the protein hydrolysate.

3. A method for rendering a protein hydrolysate resistant to viscosity increase which comprises reducing the magnesium content of the protein hydrolysate.

4. The method of claim 3, which further comprises reducing the calcium content.

5. A method for reducing the viscosity of a protein hydrolysate which comprises:
   (a) adding a pyrophosphate to the hydrolysate to form insoluble magnesium and/or calcium pyrophosphate salts; and then
   (b) removing the insoluble salts.

6. The method of claim 1, wherein the pyrophosphate is an alkali metal or ammonium pyrophosphate salt.

7. The method of claim 1, wherein the pyrophosphate is tetrasodium pyrophosphate, tetrapotassium pyrophosphate or tetraammonium pyrophosphate.

8. The method of claim 1, wherein the protein hydrolysate is a vegetable or animal protein hydrolysate obtained by acid, alkali or enzyme hydrolysis or any combination thereof.

9. A method for reducing the viscosity of a protein hydrolysate which comprises:
   (a) adjusting the pH of the protein hydrolysate to greater than 7.0;
   (b) adding a salt selected from the group consisting of carbonates, silicates, orthophosphates or combinations thereof to form insoluble magnesium and/or calcium salts; and then
   (c) removing the insoluble salts.

10. A method for preventing increase of viscosity of a protein hydrolysate comprising:
   (a) adding a pyrophosphate to the hydrolysate to form insoluble magnesium and/or calcium pyrophosphate salts; and then
   (b) removing the insoluble salts.

* * * * *

UNITED STATES PATENT AND TRADEMARK OFFICE
CERTIFICATE OF CORRECTION

PATENT NO. : 4,668,772
DATED : May 26, 1987
INVENTOR(S) : Eldon C. Lee

It is certified that error appears in the above-identified patent and that said Letters Patent is hereby corrected as shown below:

Column 5, line 34, "$Na_4P_2O_72Mg^{+2}$" should be --$Na_4P_2O_7 + 2Mg^{+2}$--.

Claim 6, column 12, line 32, "The method of claim 1," should read --The method of claim 5,--.

Claim 7, column 12, line 34, "The method of claim 1," should read --The method of claim 5,--.

Claim 8, column 12, line 37, "The method of claim 1," should read --The method of claim 5,--.

Signed and Sealed this

Twenty-second Day of September, 1987

*Attest:*

DONALD J. QUIGG

*Attesting Officer*   *Commissioner of Patents and Trademarks*